Feb. 3, 1942.   G. E. TCIMPIDIS   2,271,848
INDEXING MECHANISM
Filed Nov. 2, 1938   5 Sheets-Sheet 1

INVENTOR.
BY George E. Tcimpidis
Wood & Wood ATTORNEYS

Feb. 3, 1942.　　　G. E. TCIMPIDIS　　　2,271,848
INDEXING MECHANISM
Filed Nov. 2, 1938　　　5 Sheets-Sheet 3

INVENTOR.
George E. Tcimpidis
ATTORNEYS

Feb. 3, 1942.  G. E. TCIMPIDIS  2,271,848
INDEXING MECHANISM
Filed Nov. 2, 1938   5 Sheets-Sheet 4

INVENTOR.
BY George E. Tcimpidis
Word & Word ATTORNEYS

Feb. 3, 1942.   G. E. TCIMPIDIS   2,271,848
INDEXING MECHANISM
Filed Nov. 2, 1938   5 Sheets-Sheet 5

INVENTOR.
BY George E. Tcimpidis
Wood & Wood ATTORNEYS

Patented Feb. 3, 1942

2,271,848

UNITED STATES PATENT OFFICE 2,271,848

INDEXING MECHANISM

George E. Tcimpidis, Cincinnati, Ohio, assignor to The Bradford Machine Tool Company, Cincinnati, Ohio, a corporation of Ohio Application November 2, 1938, Serial No. 238,314

7 Claims. (Cl. 90—56)

This invention relates to machine tools and is particularly directed to an automatic machine for performing various operations such as facing, and the drilling, countersinking and tapping of holes. More particularly, as a result of the invention, apparatus has been provided which will feed and hold a given article at any one of a plurality of stations. That is to say, the articles of work are mounted at spaced intervals around a work table and the table is operated to stop the work in front of the particular stations. Any given piece of work passing through the machine will have the operations successively performed thereon.

Apparatus has been provided in the past for indexing a work table to a series of positions. However, the present invention provides distinct advantages over the indexing mechanisms of the past, not only as to the indexing mechanism per se, but as to the means controlling its operation and synchronizing or interlocking its operation with the operation of the various tool carrying slides operating toward the work.

It has been the object of the present invention to provide a mechanical electrical control and operating means for moving a work table from one position to another, and when the machine has paused, for performing an operation on the work, in which means the stopping of the table is accomplished electrically without jar, through control of an indexing motor and wherein the table is accurately centered in position. Furthermore, an extremely efficient interlock arrangement has been provided whereby the work table and the tool or tools are electrically operated and the circuits for the respective movements interlocked so that there can be no disarrangement of the cycle.

In the first place, this inventor has provided an indexing mechanism which intermittently rotates the table rapidly and brings the same to a stop without jarring or pounding of the mechanism and which thereafter locks the table in position. The table is securely and positively locked in position when the operation is being performed on the work, so that there is no chance for disalignment or vibration which would cause inaccuracy.

In the second place, the present improvements in the art of indexing have provided an indexing table unit in which the indexing movement and the locking are fully automatic. That is to say, the operator starts a given cycle of movement of the index table so that it will pass the article of work from one station to the next preceded by an unlatching action and terminating in a latching action. The indexing table is rotated by means of an electric motor energized when a start button is operated and deenergized when a switch is actuated by the mechanical indexing movement.

In the third place, the machine is fully automatic except for loading and unloading by the operator. It is controlled throughout and synchronized by electrical means, with the electrical circuits for the indexing mechanism and the tool slides completely interlocked so that the indexing mechanism cannot operate when a slide is disposed forwardly toward the work. Thus, there is no possibility of damage through mechanical interference which might ordinarily result from carelessness of the operator.

The arrangement additionally provides circuit maintaining and controlling means whereby the cycle of operation which includes indexing the work to a position and thereupon performing an operation thereon is initiated by a push button which is immediately thrown out of circuit so that thereafter during the cycle the motion of the machine is no longer under the control of the operator but follows a definite or fixed course.

In general, the apparatus provides electrical control means which initially maintain the circuit to the indexing motor for moving the index table to a predetermined position. Thereupon, when the table has reached this position, a switch is effective for energizing a circuit to a plugging switch and this switch through its mechanical operation following a reversal of the field of the index motor, deenergizes the motor. When this has resulted and the mechanical lock on the index table has fixed the table against further movement, then only may the tool slide or slides move into the work. As the slides move in, the circuit is completely broken to the index motor and it cannot possibly operate. The arrangement is such that this condition continues to exist until the tool slides are back. The reversal of the slides or drilling motors is automatic when the work has been performed.

Certain other provisions and advantages of this invention will be more fully apparent in the description of the drawings in which:

Figure 3 is a front view illustrating the machine with all of the work and work-holding fixtures removed from the turret or index table.

Figure 6:
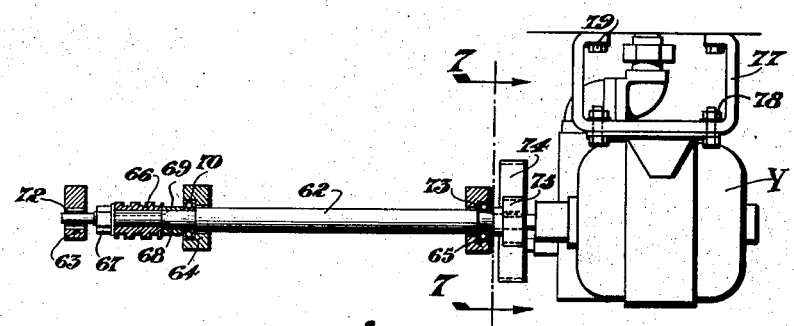
Figure 6 is a view of the index driving unit removed from the machine.
Figure 7:
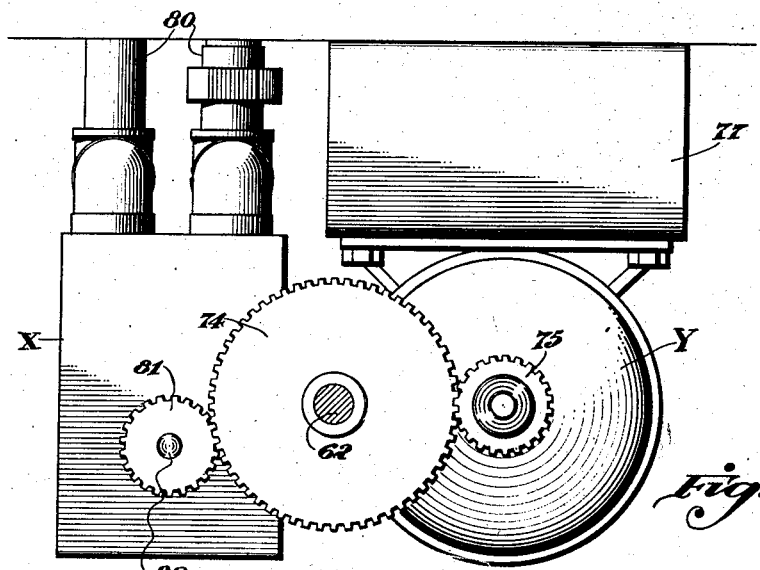
Figure 7 is a sectional view taken on line 7—7.

Figure 6, showing the means for driving the plugging switch.

Figure 1:
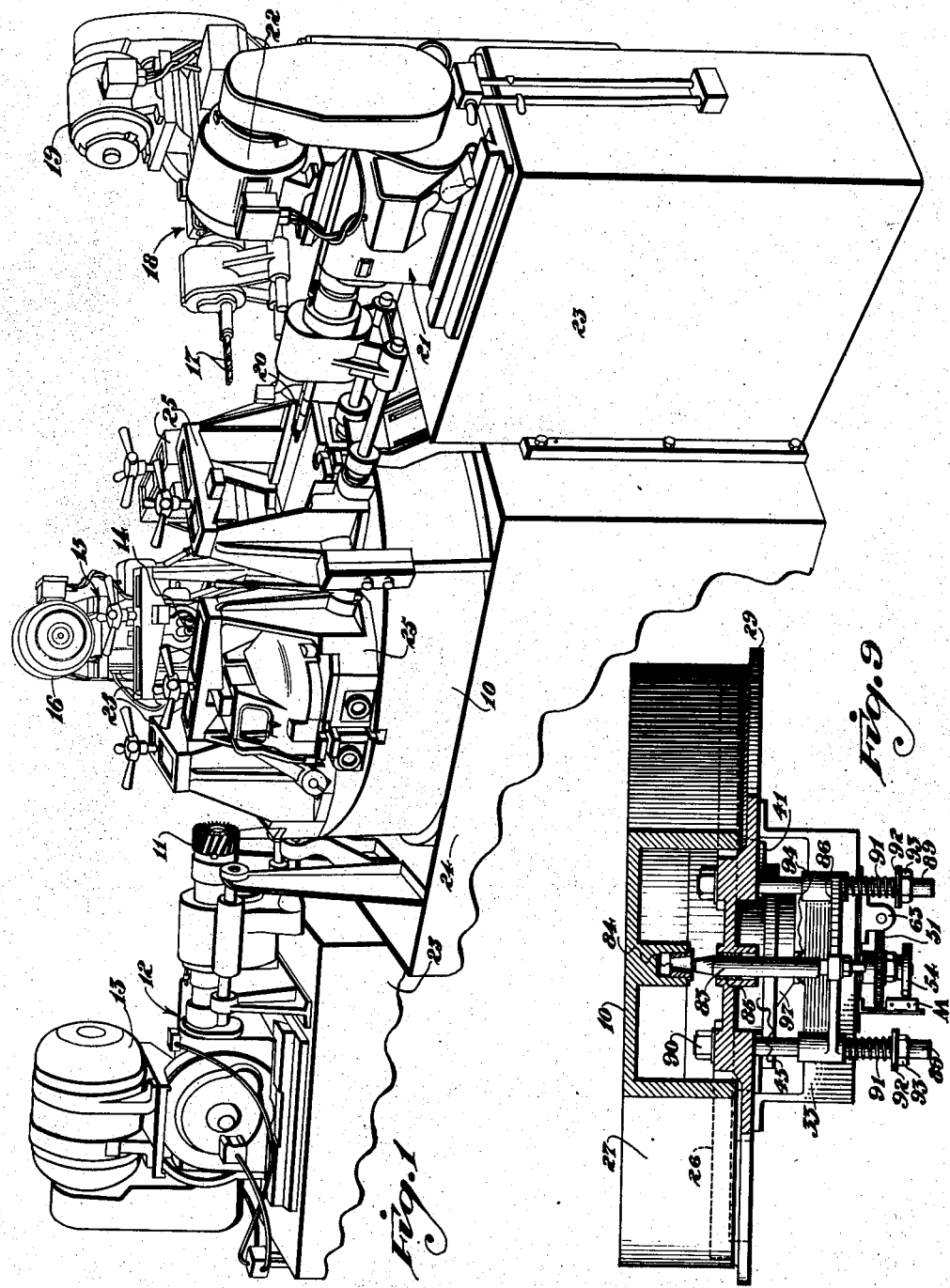
Figure 1 is a perspective view of a multiple unit automatic machine including the present improvements.
Figure 2:
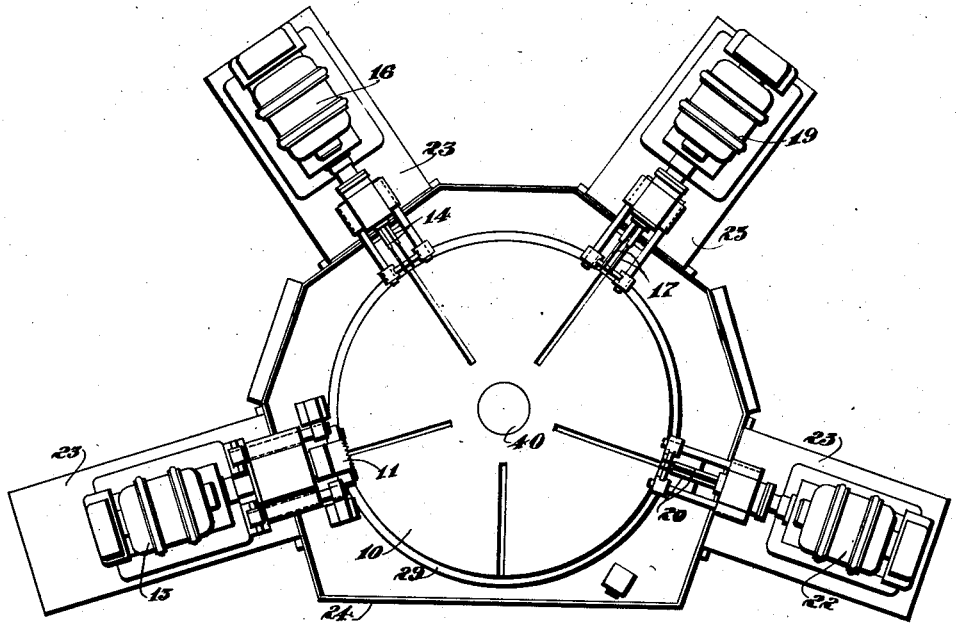
Figure 2 is a top plan view of the machine illustrated in Figure 1.
Figure 5:
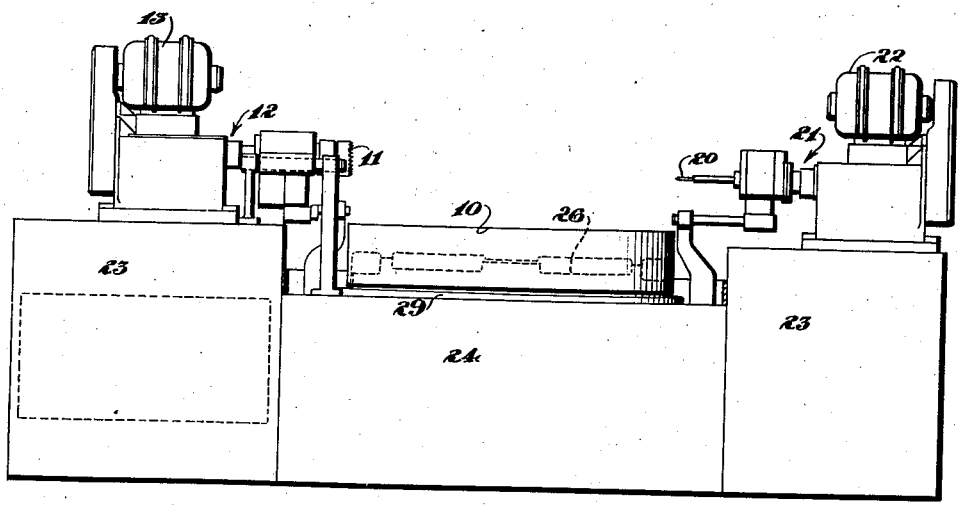
Figure 5 is a sectional view taken generally on line 5—5, Figure 4, detailing the indexing mechanism for moving the index table to its stations.
Figure 8:
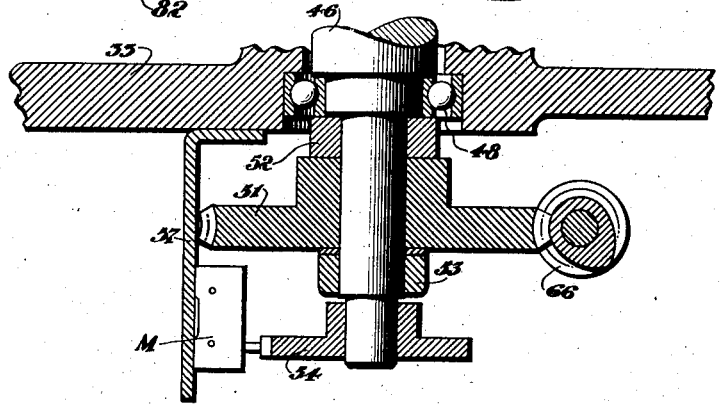

Figure 8 is a sectional view taken on line 8—8, Figure 5, illustrating the drive for the Geneva gear mechanism and showing the index limit switch and its operating means.

Figure 4:
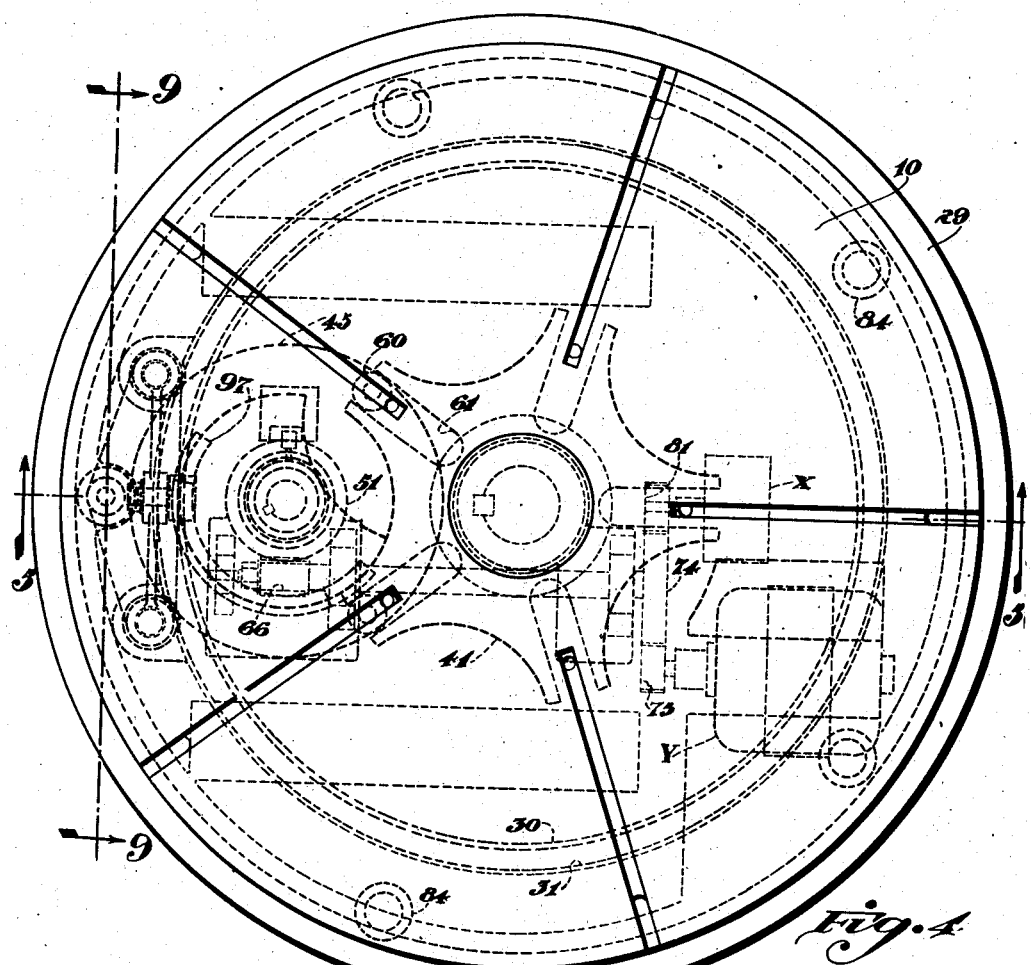
Figure 4 is a view showing the index table separately.
Figure 5:
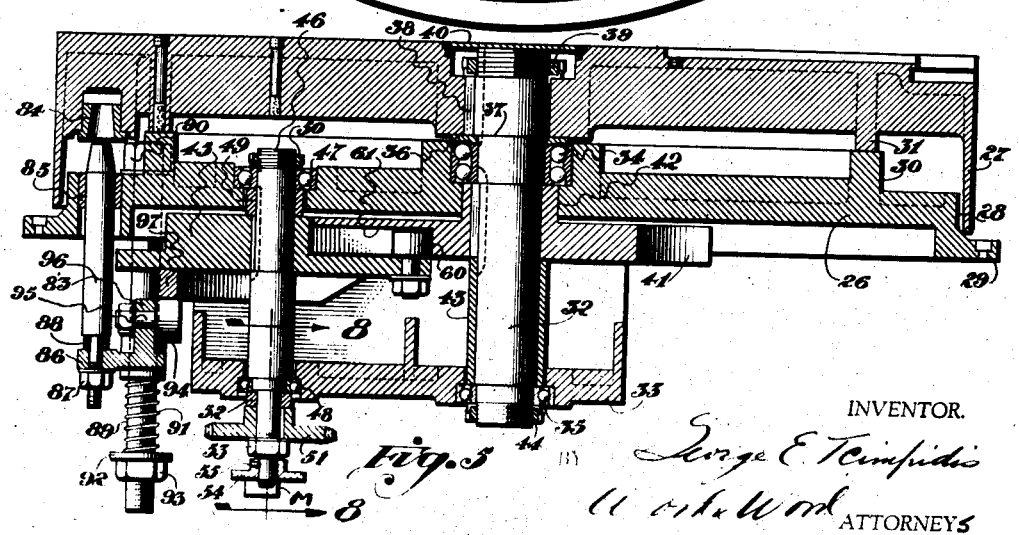

Figure 9 is a sectional view taken on line 9—9, Figure 4.

Figure 10:
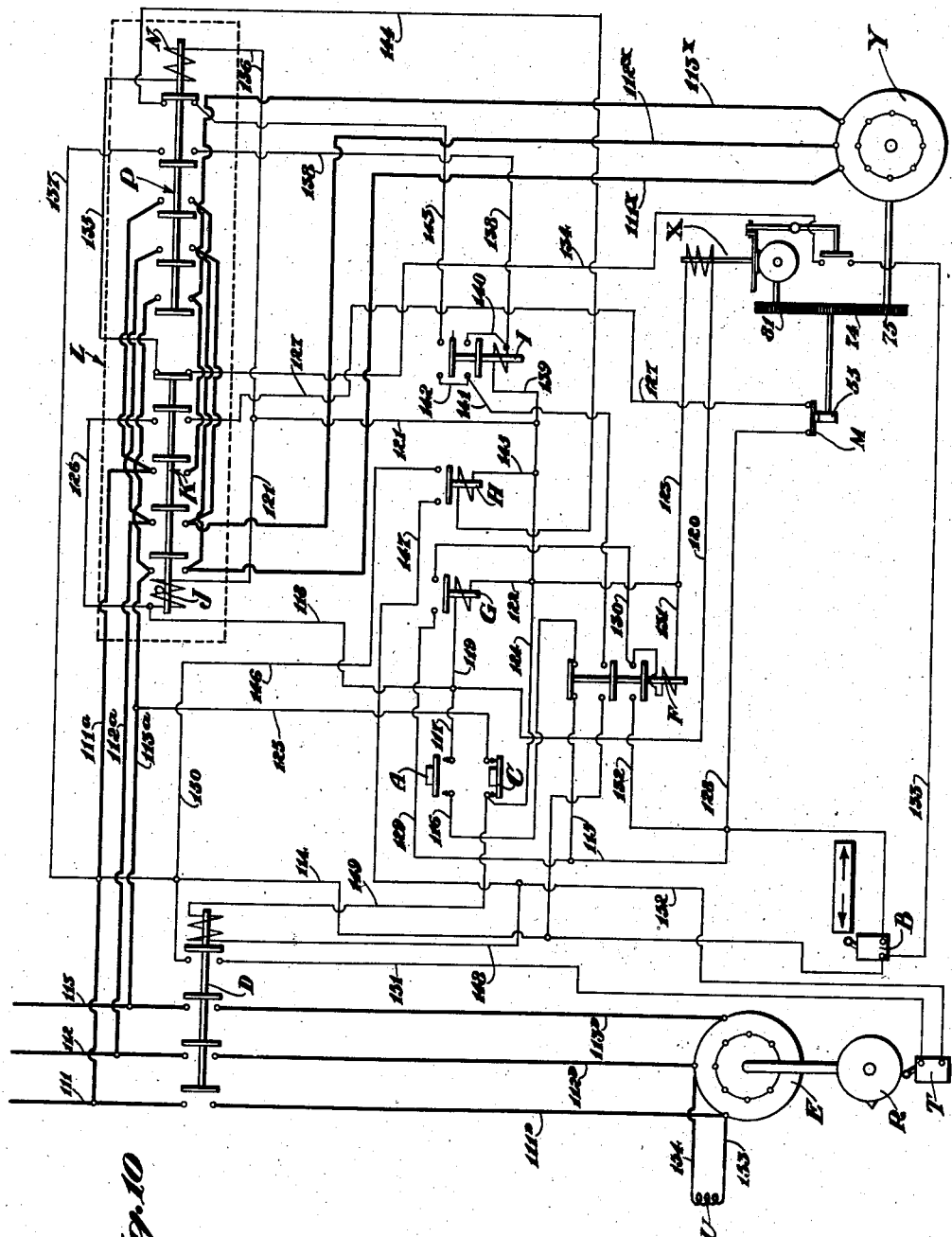

Figure 10 is a wiring diagram illustrating the circuit and apparatus for controlling the automatic cycle of the machine.

It is not believed necessary to describe in detail the structure of the various units surrounding the work table 10. The table has five stops. Each piece of work (in this instance, an automobile clutch housing) makes five stops. The first stop is the loading station which is disposed toward the front of the machine.

At the next or second station, the work is subjected to a facing operation by means of a facing mill 11, moved into engagement with the work by means of slide mechanism generally indicated at 12 actuated by the mill driving motor 13.

At the next or third station, the work is drilled by means of drills 14, carried by a slide mechanism 15 actuated by means of the drill driving motor 16.

At the next or fourth station, the piece of work is countersunk by means of countersinking tools 17, moved into the work by means of a slide mechanism generally indicated at 18 actuated by the tool driving motor 19.

At the next or fifth station, the piece of work is tapped by means of taps 20 moved into the work by the slide mechanism generally indicated at 21 and driven by the tap driving motor 22.

All four of these units are supported on respective tables constituted by box-like structures 23, surrounding and attached to the bed 24 which supports the work table 10. The work table accommodates five work-holding fixtures indicated at 25.

The machine is entirely automatic except for loading and unloading by the operator, and is controlled throughout and synchronized by electric means (described later) using limit switches, relays, solenoid operated clutches and a plugging switch controlling the index motor. A completely interlocked electric circuit is provided and prevents any possibility of damage through mechanical interference or carelessness of the operator.

The index table, hereinafter described, is capable of indexing work weighing three thousand pounds through an arc of approximately seventy-two degrees in one and one-half seconds without jarring or pounding, such as would be detrimental to or damage the mechanism or render the work inaccurate.

The index table 10 is rotatably journalled in and upon a support plate 26 of circular form corresponding generally to the form of the table and fixed to the top of the bed 24. As shown in Figure 5, the work table includes a circular flange or apron 27 overhanging the outer periphery 28 of the support plate and depending substantially to, but clearing, the attaching flange 29 of the plate. A substantial portion of the weight of the index table is carried upon a circular flange 30 projecting upwardly from the upper face of the plate and engaged by a depending circular flange 31 of the index table. The top of the index table is provided with radially disposed dovetailed slots for receiving the conventional T-bolts for holding the fixtures in their various circumferentially spaced positions on the index table.

A heavy shaft 32 provides for rotation of the index table. This shaft is journalled in the plate 26 and in a bearing bracket 33, fixed to the under side of the plate. Double bearing 34 is provided within the circular bore of the plate for supporting the upper end of the shaft, and bearing 35 supports the lower end thereof in the bracket 33. The bore in the plate is countersunk to receive the bearing 34.

A thrust washer 36 rests on the top of the bearing and is disposed beneath a shoulder 37 of the shaft. The upper end of the shaft is fixed to the index table by means of a key 38 and the table is held upon the shaft by a nut 39 screwed on the screw-threaded upper end of the shaft and engaged against the upper side of the index table within a counterbored portion thereof. Cover plate 40 conceals the attachment.

A Geneva star wheel 41 is keyed to the shaft below the support plate and has its hub 42 disposed in the bore of the support plate and against the inner race of the bearing. A spacer sleeve 43 disposed around the lower end of the shaft, between the star wheel and the lower bearing, serves to support the star wheel, and a nut 44 on the lower end of the shaft, completes the assembly.

The actuator 45, for the Geneva star wheel, is fixed to a shaft 46 and journalled in upper and lower bearings 47 and 48 in the bearing plate and bearing bracket respectively. The actuator 45 is engaged against a shoulder of the shaft and a spacer sleeve 49 is disposed between the actuator and the inner race of the upper bearing. A nut 50 on the upper end of the shaft, holds the inner race of the bearing 47, the sleeve 49, and the actuator 45 against the shoulder. The actuator is rotated by means of a worm wheel 51, keyed on the lower end of the shaft and held against a spacer 52, engaging the inner race of the lower bearing by means of a nut 53.

A switch operating cam 54 is secured to the extreme lower end of this shaft by means of a set screw 55, and has peripheral contact with, and actuates an index limit switch M (see Figure 8) supported on a bracket 57, depending from the underside of the bracket 33. The function and operation of this switch M will be disclosed later in the description of the wiring diagram.

The actuator 45 of the Geneva gear mechanism is of conventional form and includes properly spaced rollers 60, alternately entering successive slots 61 of the star wheel 41. The hub of the actuator is appropriately grooved or notched so as to clear the projecting slotted portions of the star wheel as the star wheel is moved.

A driving shaft 62, for the index mechanism, is journalled in three bearings 63, 64, and 65, attached to the under side of the bracket 33. The worm 66 is keyed to this shaft between the bearings 63 and 64 and is in mesh with the worm wheel 51. A nut 67 fixes the worm against the counterturned shoulder 68 of the shaft. A spacer sleeve 69 is disposed between the ball bearing 70 in bracket 64 and the end of the worm. The outer end of the shaft beyond the nut 67 is disposed in bearing 72 in the bearing bracket 63. The other end of the shaft is sustained in a ball bearing 73 in bearing 65 and has a large gear 74 fixed thereon beyond the bearing. Gear 74 meshes with the pinion 75 of the index motor Y.

The motor Y is sustained on the under side of the support plate 26 by means of a U-shaped bracket 77 and has its feet fixed to the bracket by means of bolts 78. The arms of the bracket are fixed to the plate by means of bolts 79.

A plugging switch X is driven by means of the gear 74 through a gear 81 fixed to a shaft 82 of the switch. This plugging switch, since it is geared to the motor, is effective for breaking the circuit to the motor when the motor starts to turn in a direction reverse to its normal indexing direction, which reversal occurs when the index switch M is closed. The plugging switch X is sustained from the under side of the plate 26 by means of pipe fittings 80.

The index table is locked in any one of its five positions by means of a locking plug 83 cooperating with any one of five fixed sockets 84 arranged around the under side of the index table, seventy-two degrees apart. The upper end of the locking plug is tapered, and the sockets are likewise tapered. The locking plug is translated in a bushing 85 fixed in the support plate on a vertical bore thereof. The lower end of the plug has a counterturned portion extended through an actuator yoke 86. A nut 87 on this portion fixes the yoke against a series of compressible rings 88 engaging the shoulder of the plug and permitting the plug to yield slightly if it does not engage its socket perfectly. The yoke is slidably mounted on a pair of fixed studs 89 attached to the support plate and projecting downwardly therefrom. The upper ends of the studs are counterturned where they project through the plate. Nuts 90 engaging the upper face of the plate fix the shoulders of the studs against the under side of the plate.

Coil springs 91, under compression, are engaged against the under side of the yoke by means of thrust washers 92 and nuts 93 adjustably screwed on the studs. A roller 94 is journalled on a horizontal shaft 95 in a lug 96 on the upper face of the yoke centrally thereof. This roller rides along a circular lug 97 fixed to the under side of the Geneva gear actuator coaxially thereof. The end of the lug first engaging the roller, is tapered or feathered so as to cause the roller to ride onto the lower face of the lug in the position as shown in Figure 5 for pulling the plug from the particular socket. This lug is arranged so as to engage and pull the plug before the Geneva gear star wheel is moved so that, about the time the cam operates the index switch M, the roller drops off the end of the cam and the plug engages the adjacent socket fixing the index table rigidly in position.

*Electrical circuit and operation*

Referring to the diagram showing the electrical circuit and the arrangement of the electrical devices relative to the mechanical apparatus, the parts operate as follows: To start the machine, the operator presses the starter button A and the current then flows from line 111 through control line 114 to the limit switch B. This limit switch B is the type normally standing open, but at this time, it is held closed, since the drill head is in back position, as illustrated. Flowing through this limit switch B, the current moves to the normally closed contact of the control relay F through line 115 and on through line 116 to the starter button, which is a momentary contact button. From the starter button, the current flows through line 117 to the coil J on the forward switch K of the indexing starter L by way of lead 118. The current also flows to the coil of relay G through lead 119 and to the solenoid on the plugging relay X, by way of lead 120. The return wires for these coils, namely 121, 122, and 123 connect to the stop button C and through lead 114, the circuit is back to the line 113A by way of lead 125.

As the current passes through the various coils mentioned above, the solenoids are energized, and thereupon operate the contacts which are in mechanical connection with the respective solenoids. The closing of the forward switch K energizes the indexing motor Y through leads 111X, 112X, and 113X. The current comes to the forward switch from the main lines 111, 112, 113 through leads 111A, 112A, 113A. This forward switch K is maintained in closed position through lead 126 to the closed auxiliary contact through lead 127 to the normally closed index limit switch M and back to the safety limit switch B through line 128. Note that the slide must be back or the indexing cannot take place since the switch M maintains the circuit. The energizing of relay G completes the circuit through the coil of the control relay F through leads 129 and 130, and thence through lead 131 to the other side of the line over lead 124 by way of the stop button 125 which is normally closed, then through lead 125.

This relay F maintains itself in closed position through its normally open, but now closed auxiliary contacts, and back to the main line through lead 132. With the relay F energized, the normally closed contacts of the relay, which open the circuit ahead of the starter button, make it impossible for the operator to reenergize the forward switch of the indexing starter until after the unit has completed its cycle. Since the solenoid on the plugging switch X is energized, the friction lever of the plugging switch is released, and the mechanical link is reset. This sets up this mechanism for a complete operation. It is not believed necessary to describe the plugging switch in full detail, since it is a conventional unit.

The indexing motor Y is now in operation, and rotates the table into the necessary position. When this position is reached, the cam 55 operates the indexing limit switch M. This switch is normally closed, and operation of it at this time opens the circuit to the forward switch K, through the auxiliary contacts of the forward switch. The opening of this switch also opens the circuit to the control relay G and the solenoid of the plugging switch X. The deenergization of the solenoid of the plugging switch X permits the friction lever of the switch to drop down on the rotating disk, which applies a pressure through a mechanical link and closes the normally open contacts of this switch, thus connecting leads 133 and 134.

As the coil of the forward switch K of the indexing starter unit L is deenergized, the switch closes the normally closed auxiliary contacts thereof and connects line 134 to line 135. Thus, the current flows through the solenoid coil N on the reverse switch P to line 136 and back to leads 121 and 124 to the other side of the power supply through lead 125.

The closing of the reverse switch P also closes the normally open auxiliary contacts which connect leads 137 and 138, thus energizing the solenoid coil of control relay I through line 139 back to the main line through leads 124 and 125. This relay I holds itself in through its normally open auxiliary contacts by way of leads 140 and 141.

As the indexing motor is plugged to a stop, and just as it reverses, the disk of the plugging switch reverses and moves the friction lever in the opposite direction, thus opening the contact of the plugging switch. The opening of the contact deenergizes the coil N of the reverse switch P of the index starter unit L and closes the normally closed auxiliary contacts thereof. This closing energizes control relay H through lines 142, 143, and 144, through the coil of the control relay G by way of line 145 and lines 124 and 125.

The closing of the normally open contact on control relay H closes the circuit from line 146 through line 147 and energizes the coil of the starter switch D for the drill motor E. The circuit for the coil of the switch D is completed through line 149. As the normally open auxiliary contact on the drill starter switch D closes, the current flows through line 150 through line 151 to the drill head limit switch T through line 152 back to the coil over line 148. Energizing of the drill starter switch connects power lines 111, 112, 113 to the motor by way of leads 111D, 112D, 113D. Thus, the drill motor is energized and the solenoid operated clutch U is energized through leads 153 and 154.

This operation of the motor drives the drill forwardly and opens the safety limit switch B, thereby making it impossible for the operator to start the indexing mechanism as long as the drilling unit is in motion. The drill moves forward and returns, opening the limit switch T momentarily by means of the cam R driven by the motor. The opening of this limit switch T deenergizes the drill starter at the same time the safety limit switch B is being reclosed. This operation completes the cycle, and the control circuit is again set up ready for another cycle.

If a number of slides are operated, as in the present case, a like number of contacts are provided for the control relay H, in other words, one for each slide.

Having described my invention, I claim:

1. In an automatic machine, a support, a circular table mounted for rotation on said support, means for intermittently rotating said table, a tool slide mounted adjacent said support and carrying a tool for performing an operation on the work, an indexing motor for driving said means for intermittently rotating said table, means for closing the circuit to said motor, a switch operated by said rotating means causing stopping of the motor instantly, latching means operated by said rotating means for fixing the table in position at the respective stations, electrical means energized when the indexing motor has stopped for moving the tool into the work in its operating cycle, and, a switch controlled by said tool holding the circuit to the index motor open when the tool slide is out.

2. A machine tool comprising, a base, a work table, said work table rotatively mounted on said support, a mechanism for rotating said table through a predetermined arc, a latch automatically fixing the table in position and actuated by the rotating means, an index motor for driving said rotating means, a push button switch controlling the circuit to said motor, means for maintaining the circuit to the motor in forward direction, when the push button switch is released, a switch operated by the rotating means when the table has been moved to the predetermined position and a plugging switch controlled by said last named switch for reversing the field of the motor and causing disconnection of the circuit thereto, whereby the motor stops instantly.

3. In a machine tool, a work supporting table, means for indexing said table to a plurality of positions, an electric motor for driving said means, a push button controlled circuit for starting said motor, a relay for maintaining the circuit to said motor, a switch for breaking the circuit to said motor, a plugging switch for automatically reversing and deenergizing said motor when the table has been indexed, a tool, and tool driving means including a motor and a relay for controlling said motor effective when the index motor has been deenergized.

4. In an automatic machine, a central support, a circular work holding table mounted for rotation on said support, a tool mounted adjacent said support for movement toward the work, an indexing motor intermittently rotating said table, means for initially closing the circuit to said motor, a switch operated by said rotating means causing stopping of the motor instantly, electrical means energized when the indexing motor has stopped for moving the tool into the work in its operating cycle, and, a switch controlled by said tool holding the circuit to the index motor open when the tool slide is out.

5. In an automatic machine, a support member, a work table rotatably mounted on said support, said work table including a peripheral flange depending therefrom and overhanging the sides of the support, a drive shaft for said work table, a Geneva gear element fixed to the shaft, a driver for the Geneva gear element including a cam, a latching plug mounted for movement into the underside of the work table, said work table including sockets alternately engageable by said plug, guiding means for said plug, means on the plug engaged by the cam for reciprocation into and out of the socket and, electrical means operated by the Geneva gear driver for controlling the indexing movement.

6. In a machine tool, a work table adapted to be periodically rotated, a base, a circular supporting plate mounted on said base, a circular work supporting table mounted coaxially on said plate and adapted to be rotated, said table mounted on an anti-friction bearing adjacent its axis of rotation, said base including a circular flange rising vertically, coaxially thereof, said table including a depending circular flange having a plain bearing engagement with said first named flange, said table including a circular apron depending around and enclosing but not engaging said circular plate, and means for intermittently rotating said table.

7. In an automatic table indexing mechanism, a support member, a work table rotatably mounted on said support member, a drive shaft for said work table, a Geneva gear mechanism for rotating said shaft, said mechanism including a downward extending cam, a latching plug mounted for movement into the underside of the work table, said work table including sockets successively engageable by said plug, spaced guide rods disposed parallel with said latching plug, a yoke slideably mounted on said guide rods, said latching plug carried by said yoke, and spring means for urging said yoke upwardly for engaging said plug with an adjacent socket, said cam engaging said yoke for moving the plug downwardly out of the particular socket just prior to indexing movement of the table.

GEORGE E. TCIMPIDIS.